(12) United States Patent
Kim

(10) Patent No.: US 6,226,251 B1
(45) Date of Patent: May 1, 2001

(54) SIGNAL DETECTION METHOD OF A PHASE-CHANGE OPTICAL DISK

(75) Inventor: Seong-Sue Kim, Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/144,633

(22) Filed: Aug. 31, 1998

(30) Foreign Application Priority Data

Aug. 29, 1997 (KR) .................................................. 97-43069

(51) Int. Cl.[7] ........................................................ G11B 7/00
(52) U.S. Cl. ........................................................ 369/124.01
(58) Field of Search ................................ 369/112, 44.41, 369/112.01, 116, 120, 124.01

(56) References Cited

U.S. PATENT DOCUMENTS 5,682,372 * 10/1997 Yamakawa et al. .............. 369/112 X

FOREIGN PATENT DOCUMENTS

| 7-14170 | 1/1995 | (JP) . |
| 8-96368 | 4/1996 | (JP) . |
| 8-147708 | 6/1996 | (JP) . |

* cited by examiner

Primary Examiner—Paul W. Huber
(74) Attorney, Agent, or Firm—Staas & Halsey LLP

(57) ABSTRACT

A signal detection method of an optical pickup which reproduces information from a phase-change optical disk, such that the optical pickup includes a photodetector having four light receiving regions. The signal detection method includes the steps of receiving light reflected from the phase-change optical disk using the photodetector, and detecting, as a reproduction signal, a difference between light quantities of light incident to the ones of the light receiving regions which are located forward from an optical axis of the optical pickup along a tracking direction of the optical pickup and those of light incident to the ones of the light receiving regions which are located backward from the optical axis of the optical pickup along the tracking direction of the optical pickup. As a result, the optical pickup detects a reproduction signal having a good degree of modulation, and more particularly, provides an effect that reliability of the reproduction signal is further enhanced when a signal is detected from a phase-change optical disk recorded with a high density.

8 Claims, 4 Drawing Sheets

SIGNAL DETECTION METHOD OF A PHASE-CHANGE OPTICAL DISK

CROSS-REFERENCE TO RELATED APPLICATIONS

This application claims the benefit of Korean Application No. 97-43069, filed Aug. 29, 1998, in the Korean Patent Office, the disclosure of which is incorporated herein by reference.

BACKGROUND OF THE INVENTION

The present invention relates to a signal detection method of a phase-change optical disk, and more particularly, to a signal detection method of a phase-change optical disk which can greatly improve a degree of modulation of a reproduction signal and enhance reliability of the reproduction signal.

Generally, a laser beam is irradiated on an optical disk in order to reproduce an information signal recorded on a phase-change optical disk. An angle of reflection with respect to the beam irradiated on the optical disk is varied due to a difference of the complex refractive index of each phase by a phase-change between a crystal state and an amorphous material formed on a recording layer of the optical disk. An optical pickup which is used in conjunction with a phase-change optical disk is designed to convert light which reaches a light receiving element (of the optical pickup) into an electric signal and to reproduce a recorded information signal, using an optical characteristic of a recording layer of the phase-change optical disk.

An operation of optical pickup with respect to a general phase-change optical disk is described with reference to FIG. 1. A semiconductor laser 1 emits a laser beam. A collimation lens 2 collimates the laser beam emitted from the semiconductor laser 1 in the form of a parallel light beam. The laser beam emitted in the form of the parallel light beam by the collimation lens 2 is incident to a quarter-wave plate 4 via a beam splitter 3. The beam incident to the quarter-wave plate 4 is in a plane-polarized state, and is converted into a circularly polarized beam by the quarter-wave plate 4. The circularly polarized beam is incident to an objective lens 5, and the objective lens 5 focuses the incident beam on an information recording surface of an optical disk 7. A beam reflected from the information recording surface of the optical disk 7 is incident to the quarter-wave plate 4 via the objective lens 5. The quarter-wave plate 4 converts the reflected beam into a plane-polarized beam to emit the plane-polarized beam, and a polarized plane of the emitted beam is rotated by 90° with respect to the incident beam. The beam emitted from the quarter-wave plate 4 is reflected from the beam splitter 3 and is incident to a photodetector 6. The photodetector 6 receives the light reflected from the beam splitter 3 and converts the received light into an electric signal.

A construction of the photodetector 6 is shown in detail with reference to FIG. 2. A general photodetector 6 is composed of four-divided light receiving regions 6a, 6b, 6c and 6d. That is, the reflected light from the optical disk is incident to the four light receiving regions 6a, 6b, 6c and 6d of the photodetector 6. When light quantities of the reflected light which reach the respective four light receiving regions 6a, 6b, 6c and 6d are called I1, I2, I3 and I4, respectively, the total of the light quantities of the reflected light which reaches the respective light receiving regions 6a, 6b, 6c and 6d, which is I1+I2+I3+I4, is detected as a reproduction signal.

FIG. 3 is an enlarged view showing an arrangement of a track 8 and marks 9 of a phase-change optical disk, and particularly shows the arrangement of the marks 9 on the track 8 when a signal is recorded on the phase-change optical disk by mark length recording.

However, in the case of detecting information recorded by the mark length recording using the above signal detection method, a difference in amplitude between a signal having a longer mark and a signal having a shorter mark in the reproduced signal becomes large, and thus there is high probability that an error occurs in reproducing a signal. Practically, when detecting a signal by the above method, it has been known that a degree of modulation in the reproduced signal is about 30%. FIG. 4 shows a waveform diagram of a reproduction signal detected by a general method, which shows a low modulation degree.

FIGS. 5A, 5B and 5C are views schematically showing states that laser beams are located at a front portion, an intermediate portion and a rear portion of the mark 9, respectively, and FIGS. 6A, 6B and 6C are views showing distribution of light quantities corresponding to the states when the laser beam is respectively positioned as shown in FIGS. 5A, 5B and 5C. FIGS. 6A and 6C show that the laser beam is out of the center of the mark, and it can be seen that the distribution of light quantities is asymmetrical from the right and left. This phenomenon causes a problem to lessen reliability of a reproduction signal. Particularly, such a problem is remarkably severe when a signal is detected from an optical disk recorded with a high density, i.e., an optical disk having a narrow interval between marks.

SUMMARY OF THE INVENTION

In order to solve the above problems, an object of the present invention is to provide a signal detection method of a phase-change optical disk which can greatly improve a degree of modulation of a reproduction signal and enhance reliability of the reproduction signal.

Additional objects and advantages of the invention will be set forth in part in the description which follows and, in part, will be obvious from the description, or may be learned by practice of the invention.

To accomplish the above and other objects and advantages of the present invention, there is provided a method for detecting a reproduction signal from an optical disk using an optical pickup having a photodetector which includes a plurality of light receiving regions, the method comprising the steps of (a) allowing light reflected from the optical disk to be incident to the plurality of light receiving regions of the photodetector; and (b) detecting, as a reproduction signal, a difference between light quantities of light incident to the light receiving regions which are located forward from an optical axis of the optical pickup along a tracking direction of the optical pickup and those of light incident to the light receiving regions which are located backward from the optical axis of the optical pickup along the tracking direction of the optical pickup, among the plurality of light receiving regions of the photodetector in step (a). The light quantities of each of the light receiving regions forward from the optical axis of the optical pickup along the tracking direction of the optical pickup are summed to determine a first sum and the light quantities of each of the light receiving regions backward from the optical axis of the optical pickup along the tracking direction of the optical pickup are summed to determine the second sum. The reproduction signal is determined to be the difference of the first and second sums.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
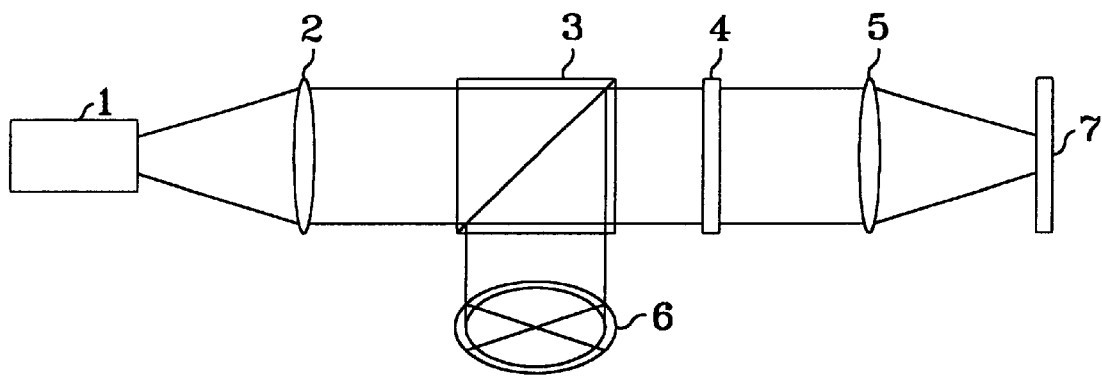
FIG. 1 is a view showing construction of an optical pickup for a general phase-change optical disk.
Figure 2:
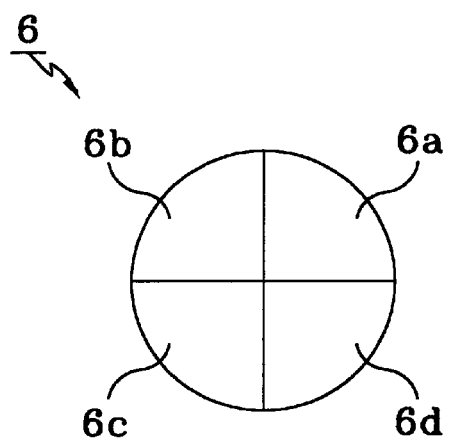
FIG. 2 is a detailed view showing a photodetector shown in FIG. 1.
Figure 3:
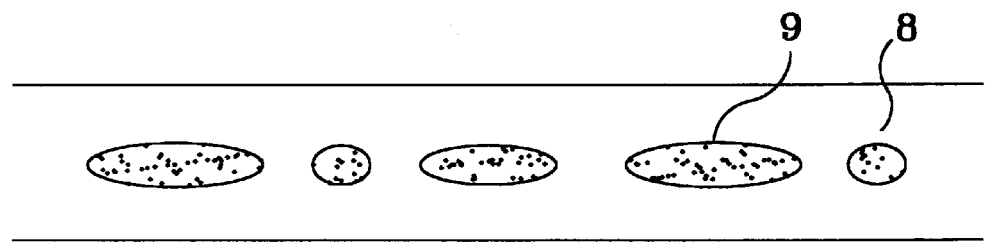
FIG. 3 is an enlarged view showing arrangement of a track and marks of a phase-change optical disk.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

An embodiment of the present invention proposes a signal detection method applied to an optical pickup for a general phase-change optical disk as shown in FIG. 1. A laser beam emitted from a semiconductor laser 1 is transmitted, in turn, through a collimation lens 2, a beam splitter 3 and a quarter-wave plate 4, and then is focussed on an information recording surface of an optical disk 7 by an objective lens 5. A beam reflected from the information recording surface of the optical disk 7 is reflected by the beam splitter 3 via the objective lens 5 and the quarter-wave plate 4. A photodetector 6 receives light reflected from the beam splitter 3. The signal detection method according to the present invention uses a difference of light quantities of light incident to four light receiving regions 6a, 6b, 6c and 6d of the photodetector 6. In more detail, among the light receiving regions 6a, 6b, 6c and 6d of the photodetector 6, a difference between light quantities of light incident to the light receiving regions 6b and 6c which are located forward from an optical axis of the optical pickup along a tracking direction of the optical pickup and those of light incident to the light receiving regions 6a and 6d which are located backward from the optical axis of the optical pickup along the tracking direction of the optical pickup, is used as a reproduction signal. That is, when the light quantities of light incident to the respective light receiving regions 6a, 6b, 6c and 6d are called I1, I2, I3 and I4, respectively, a detected reproduction signal is expressed as (I2+I3)−(I1+I4).

Figure 4:
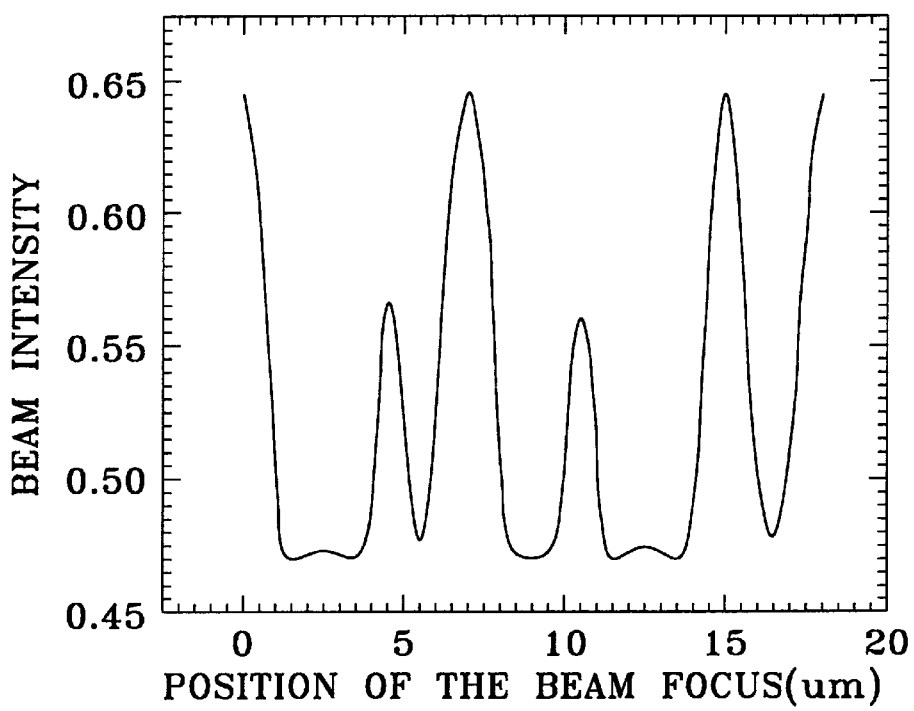
FIG. 4 is a waveform diagram of a reproduction signal detected according to a conventional signal detection method.
Figure 5A:
FIGS. 5A to 5C are views schematically showing positions of a focal point of a laser beam on the mark.
Figure 5B:
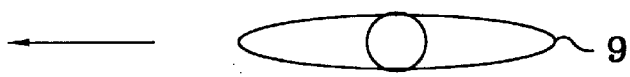
Figure 5C:
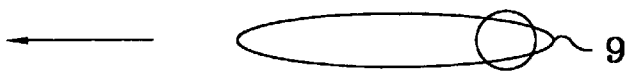
Figure 6A:
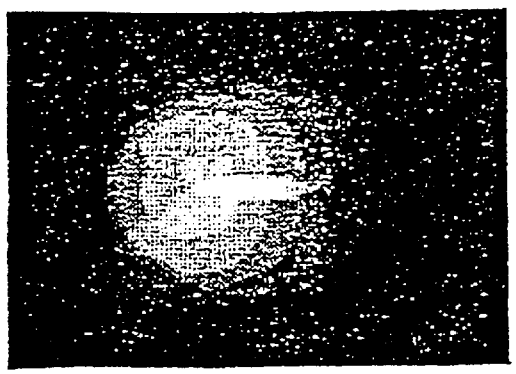
FIGS. 6A to 6C are views showing distribution of light quantities according to the positions of a focal point of a laser beam.
Figure 6B:
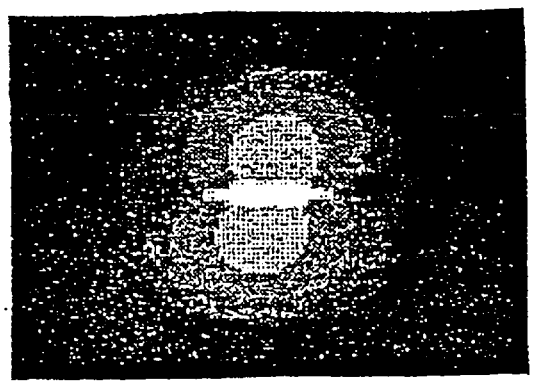
Figure 6C:
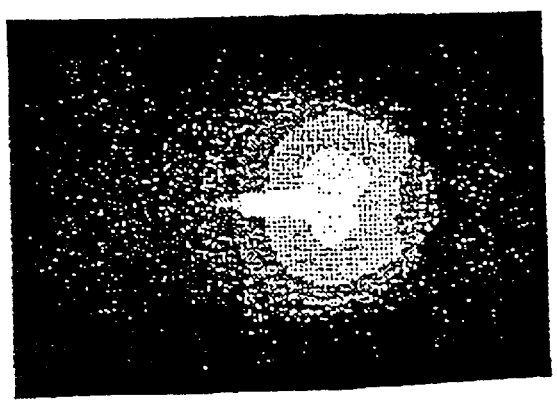
Figure 7:
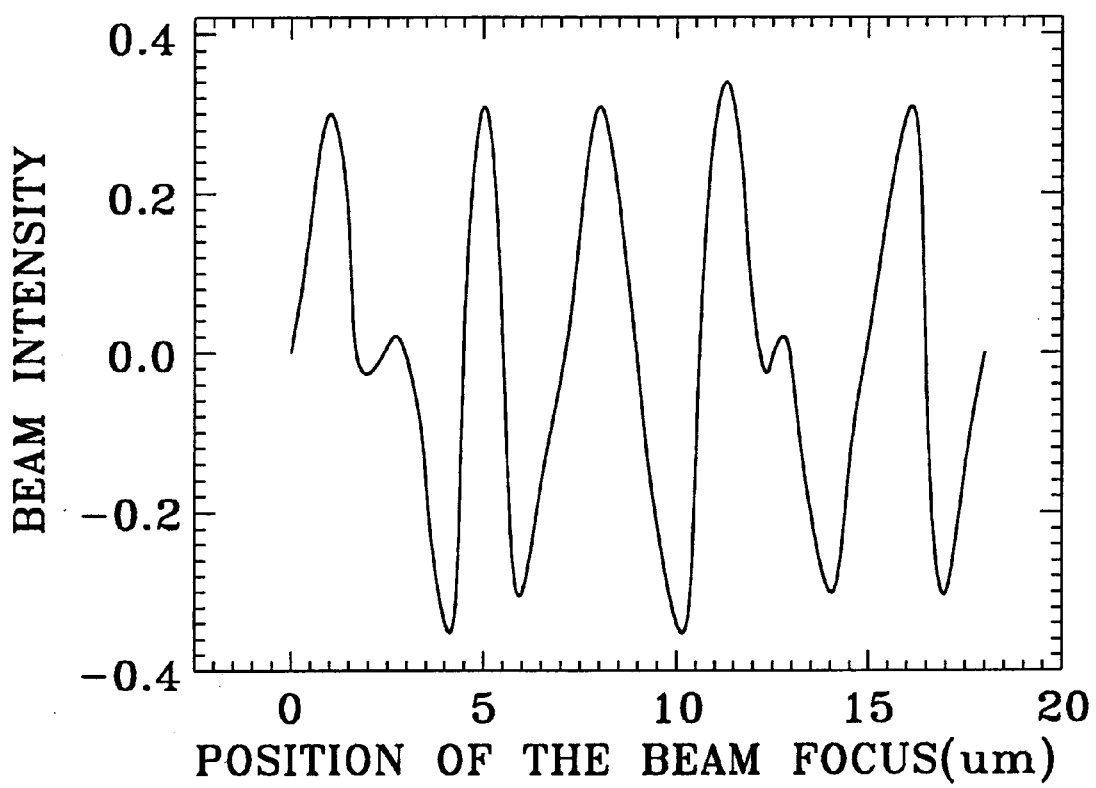
FIG. 7 is a waveform diagram of a reproduction signal detected using a signal detection method according to an embodiment of the present invention.

FIG. 7 is a waveform diagram showing a waveform of a detected signal when a signal is detected by the signal detection method according to the embodiment of the present invention. Compared with that of FIG. 4, it can be seen that a degree of modulation of a reproduction signal is greatly enhanced.

Even though the embodiment of the present invention describes the photodetector which includes four light receiving regions, it is apparent to those of ordinary skill in the art that a photodetector having two light receiving regions can be employed. A first one of the two light receiving regions is located forward from the optical axis of the optical pickup along the tracking direction of the optical pickup and a second one of the two light receiving regions is located backward from the optical axis of the optical pickup along the tracking direction of the optical pickup. A difference between the light quantities of light incident on the two light receiving regions is determined to be the reproduction signal.

As described above, a reproduction signal having a good degree of modulation can be obtained using a signal detection method of a phase-change optical disk according to the present invention. When a signal is detected from the phase-change optical disk recorded with a high density, the present invention provides an effect that reliability of the reproduction signal is further enhanced.

While only a certain embodiment of the invention has been specifically described herein, it will be apparent that numerous modifications may be made thereto without departing from the spirit and scope of the invention.

What is claimed is:

1. A method of detecting a reproduction signal from an optical disk using an optical pickup having a photodetector which includes a plurality of light receiving regions, the method comprising:

allowing light reflected from the optical disk to be incident to the plurality of light receiving regions of the photodetector; and detecting, as a reproduction signal, a difference between a first light quantity of light incident to at least one of the light receiving regions which are located forward from an optical axis of the optical pickup along a tracking direction of the optical pickup and a second light quantity of light incident to at least one of the light receiving regions which are located backward from the optical axis of the optical pickup along the tracking direction of the optical pickup, among the plurality of light receiving regions of the photodetector receiving the reflected light.

2. The method for detecting a reproduction signal according to claim 1, wherein said photodetector comprises four light receiving regions.

3. The method for detecting a reproduction signal according to claim 1, wherein said photodetector comprises two light receiving regions.

4. The method for detecting a reproduction signal according to claim 1, wherein said photodetector comprises four light receiving regions of which a first two are located forward from the optical axis of the optical pickup along the tracking direction of the optical pickup and a second two are located backward from the optical axis of the optical pickup along the tracking direction of the optical pickup, said detecting further comprises:

summing respective light quantities received by the first two light receiving regions, to determine the first light quantity;

summing respective light quantities received by the second two light receiving regions, to determine the second light quantity; and determining the difference between the first and second light quantities, to detect the reproduction signal.

5. The method for detecting a reproduction signal according to claim 1, wherein said photodetector comprises two light receiving regions of which a first one is located forward from the optical axis of the optical pickup along the tracking direction of the optical pickup and a second one is located backward from the optical axis of the optical pickup along the tracking direction of the optical pickup, said detecting further comprises:

determining the first light quantity received by the first light receiving region;

determining the second light quantity received by the second light receiving region; and determining the difference between the first and second light quantities, to detect the reproduction signal.

6. A method of detecting a reproduction signal from an optical disk using an optical disk having a photodetector, the method comprising:

enabling light reflected from the optical disk to be incident on the photodetector at a forward position from the optical axis of the optical pickup along a tracking direction of the optical pickup and at a backward position from the optical axis of the optical pickup along the tracking direction of the optical pickup; and determining a difference between a first light quantity received at the forward position and a second light quantity received at the backward position.

7. The method of detecting a reproduction signal according to claim 6, wherein the photodetector includes twos light receiving portions, a first one of the two light receiving portions being located at the forward position from the optical axis of the optical pickup along the tracking direction and a second one of the two light receiving portions being located at the backward position from the optical axis of the optical pickup along the tracking direction, said determining further comprising:

determining the first light quantity received by the first light receiving region;

determining the second light quantity received by the second light receiving region; and determining the difference between the first and second light quantities, to detect the reproduction signal.

8. The method of detecting a reproduction signal according to claim 6, wherein the photodetector includes four light receiving portions, a first two of the four light receiving portions being located at the forward position from the optical axis of the optical pickup along the tracking direction and a second two of the four light receiving portions being located at the backward position from the optical axis of the optical pickup along the tracking direction, said determining further comprising:

summing respective light quantities received by the first two light receiving regions, to determine the first light quantity;

summing respective light quantities received by the second two light receiving regions, to determine the second light quantity; and determining the difference between the first and second light quantities, to detect the reproduction signal.

* * * * *